United States Patent [19]

Kerner et al.

[11] Patent Number: 5,584,522
[45] Date of Patent: Dec. 17, 1996

[54] STOWAGE-SPACE ARRANGEMENT FOR VEHICLES WITH A FOLDING ROOF

[75] Inventors: Wolfgang Kerner, Bondorf; Mark Muehlhausen, Stuttgart, both of Germany

[73] Assignee: Mercedes-Benz AG, Stuttgart, Germany

[21] Appl. No.: 523,929

[22] Filed: Sep. 6, 1995

[30] Foreign Application Priority Data

Sep. 6, 1994 [DE] Germany ............... 44 31 656.9

[51] Int. Cl.$^6$ .................................................. B60R 5/04
[52] U.S. Cl. .................. 296/37.16; 296/108; 297/188.1
[58] Field of Search ................. 296/37.16, 107, 296/108; 297/188.1, 188.09; 108/44; 224/275

[56] References Cited

U.S. PATENT DOCUMENTS

| | | | |
|---|---|---|---|
| 1,784,279 | 12/1930 | Ellerbeck | 296/107 |
| 1,819,545 | 8/1931 | Delp . | |
| 1,940,444 | 12/1933 | Burgman . | |
| 2,191,269 | 2/1940 | Atwater | 296/107 |
| 3,817,190 | 6/1974 | Evangelista | 108/44 |
| 4,202,577 | 5/1980 | Breitschwerdt et al. | 296/37.16 |
| 4,796,943 | 1/1989 | Fukutomi et al. | 296/107 |
| 4,854,634 | 8/1989 | Shiraishi et al. | 296/108 |
| 5,011,208 | 4/1991 | Lewallen | 296/37.16 |
| 5,046,433 | 9/1991 | Kramer et al. | 108/44 |

FOREIGN PATENT DOCUMENTS

| | | | |
|---|---|---|---|
| 748011 | 6/1933 | France . | |
| 2695081 | 3/1994 | France . | |
| 3623468 | 1/1987 | Germany | 296/107 |
| 31665 | 3/1980 | Japan | 296/37.16 |
| 650980 | 8/1985 | Switzerland | 296/107 |
| 94006647A1 | 3/1994 | WIPO | 296/37.16 |

*Primary Examiner*—Gary C. Hoge
*Attorney, Agent, or Firm*—Evenson, McKeown, Edwards & Lenahan, P.L.L.C.

[57] ABSTRACT

A stowage-space arrangement for vehicles with a folding roof, especially for convertibles with a solid roof that can be folded in two parts, includes a stowage space which is arranged between side walls of the body and into which at least one rearward roof part of the folding roof can be retracted. The rearward roof part includes a rear-wall area which slopes obliquely relative to the roof surface. To allow the rearward roof part to be made longer and to provide an improved facility for stowing luggage in the interior space of the vehicle, the stowage space has at its bottom end a large-size floor area which, with the folding roof stowed, is covered by the rear-wall area of the rearward roof part. A free space that can be used as a luggage space is provided above the rear-wall area of the retracted roof part.

12 Claims, 3 Drawing Sheets

STOWAGE-SPACE ARRANGEMENT FOR VEHICLES WITH A FOLDING ROOF

BACKGROUND AND SUMMARY OF THE INVENTION

The invention relates to a stowage-space arrangement for vehicles with a folding roof, especially for convertibles with a solid roof that can be folded in two parts. The stowage-space arrangement includes a stowage space which is arranged between the side walls of the vehicle body and into which at least one rearward roof part of the folding roof can be retracted. The rearward roof part includes a rear-wall area which slopes obliquely relative to the roof surface.

A known stowage-space arrangement of the above-mentioned type is disclosed, for example, in U.S. Pat. No. 1,940,444. The stowage space for the retraction of the rearward roof part comprises a relatively narrow well. The cross-section of the well is matched to the path taken by the rear-wall area during its folding movement. As a result, the rearward roof part of the folding roof can only have a correspondingly short length in order to allow for complete retraction of the rearward roof part. This considerably restricts the freedom available for the design of the rearward roof part.

Between the stowage space and the front row of seats in the known convertible there is a closed hollow chamber, arranged centrally, in which there is a gear arrangement for the rearward roof part. The gear arrangement can be swivelled using a hand crank. There is thus virtually no possibility of accommodating pieces of luggage or the like in the interior of the convertible below the top edge of the side walls so as to allow them to be stowed easily from the front row of seats.

There is therefore needed a stowage-space arrangement of the above-mentioned type developed in such a way that a relatively long rearward roof part can be retracted into the stowage space and that, in addition, the possibilities for stowing luggage in the interior of the vehicle are improved.

These needs are met according to the present invention by a stowage-space arrangement including a stowage space which is arranged between the side walls of the vehicle body and into which at least one rearward roof part of the folding roof can be retracted. The rearward roof part includes a rear-wall area which slopes obliquely relative to the roof surface. The stowage space has at its bottom end a large-sized floor area which, with the folding roof stowed, is covered by the rear-wall area of the rearward roof part. A free space, which can be used as a luggage or storage space, is provided above the rear-wall area of the retracted roof part.

It is an advantage of the present invention that, with the folding roof stowed, the upward-facing opening of the stowage space is largely covered by a forward roof part. The luggage space is bounded at the top by the forward roof part.

In a further embodiment of the present invention, the lower boundary of the luggage space is a luggage shelf which spans the rear-wall area with a clearance. The luggage shelf is designed as a bottom plate which projects rearwardly from a holding component arranged in front of the luggage space. The bottom plate is mounted on the holding component in a manner which allows for it to be raised.

Yet another embodiment of the present invention provides an arrangement of tensile elements between the bottom plate and the holding component. This arrangement of tensile elements can be transferred to its tensioned position by the lowering of the bottom plate.

According to an embodiment of the present invention, the stowage space is a rear-seat area. The rear seat arrangement can be folded forward into an out-of-use position. In this out-of-use position, one part of the rear-seat arrangement forms a front boundary wall of the luggage space.

In accordance with the present invention, with the folding roof stowed, there is an elongated see-through opening between the front end of the forward roof part and a front boundary of the luggage or storage space. This see-through opening can be covered via a screening device. The screening device can be provided in the form of a roller-blind web which can unwound from a winding roller. The winding roller is preferably arranged along the lower side of the see-through opening. In addition to the winding roller, the roller-blind arrangement can include a further winding roller, onto which can be wound a roller-blind web that can be used instead of a luggage spider.

Other objects, advantages and novel features of the present invention will become apparent from the following detailed description of the invention when considered in conjunction with the accompanying drawings.

DETAILED DESCRIPTION OF THE DRAWINGS

Figure 1:
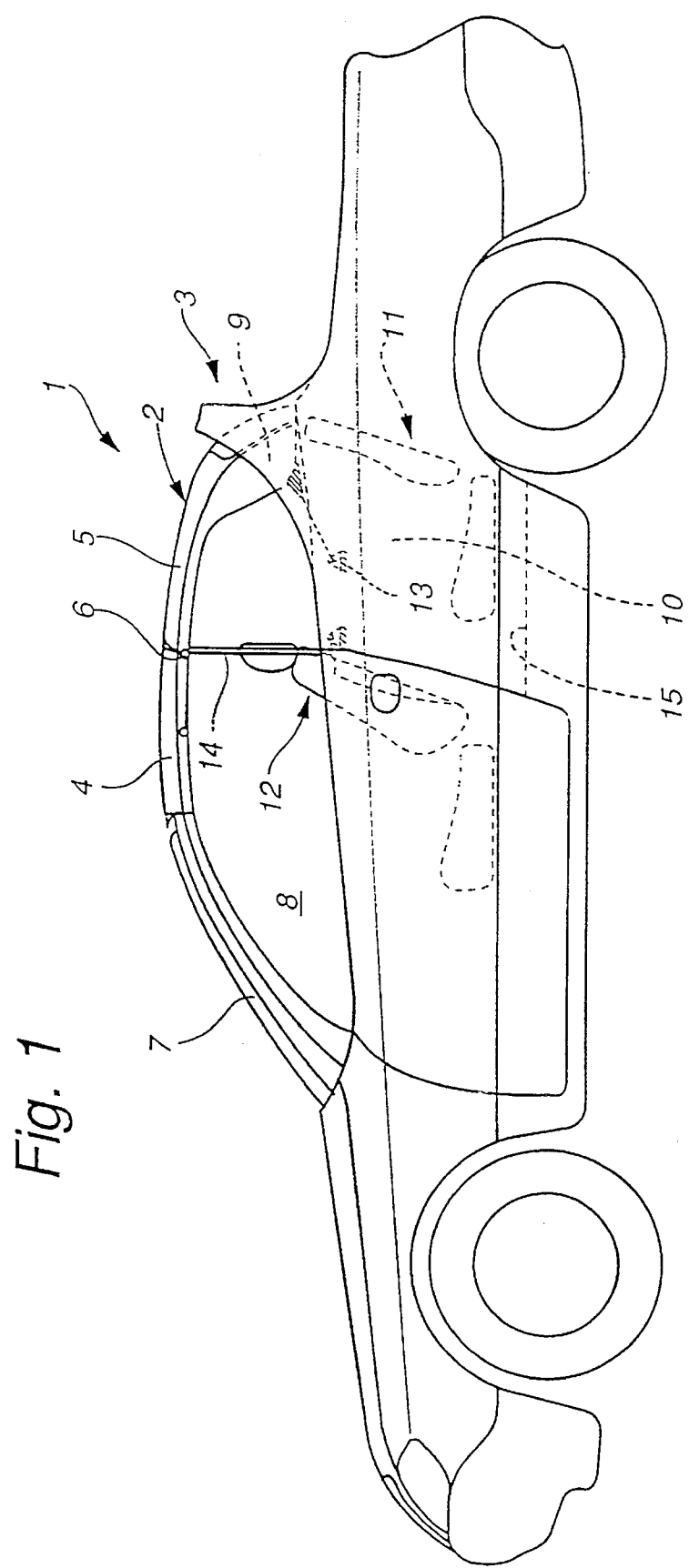
FIG. 1 is a schematic side view of a convertible with the folding roof closed.
Figure 2:
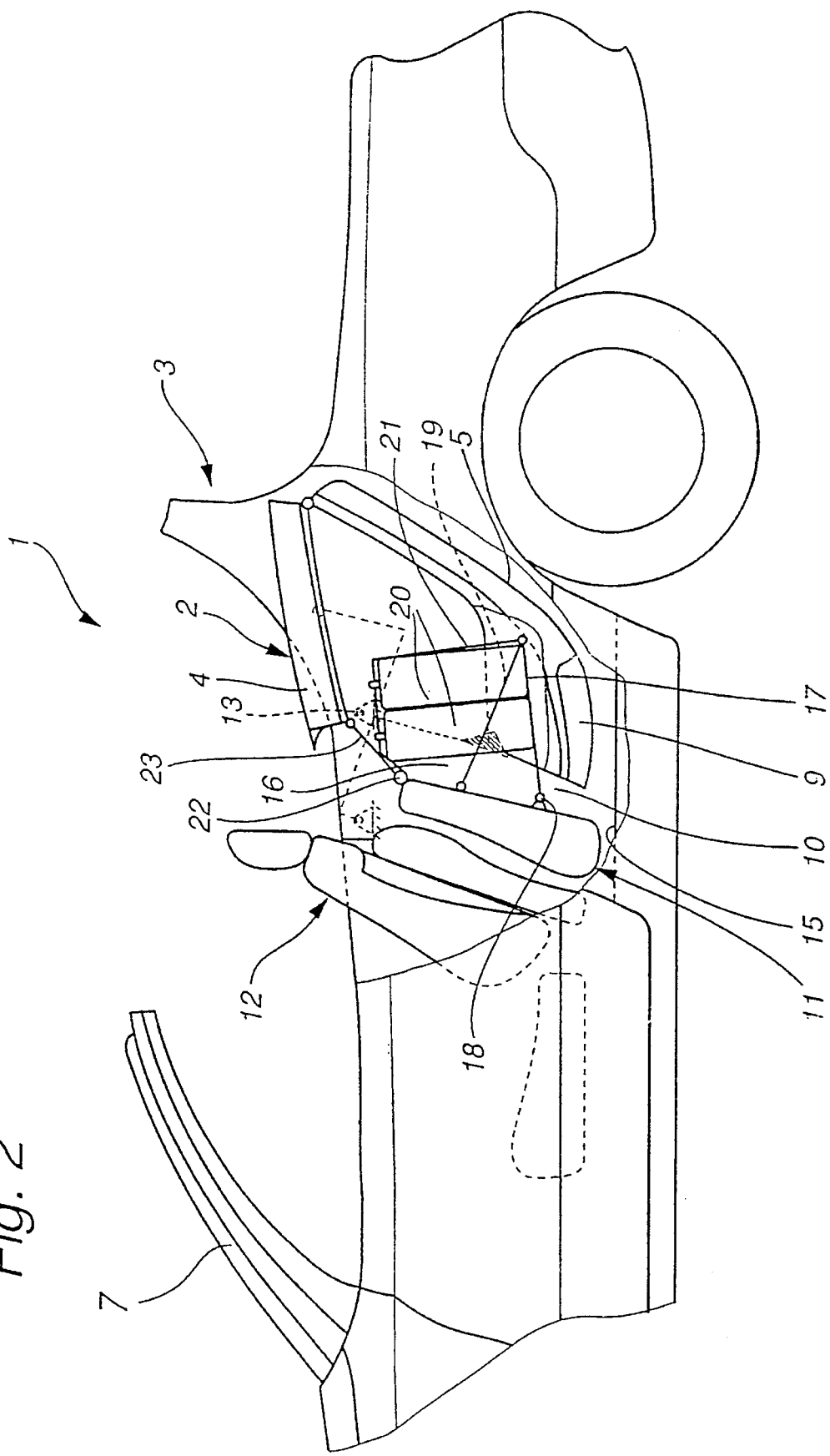
FIG. 2 is a schematic side view of the convertible of FIG. 1 with the folding roof open.
Figure 3:
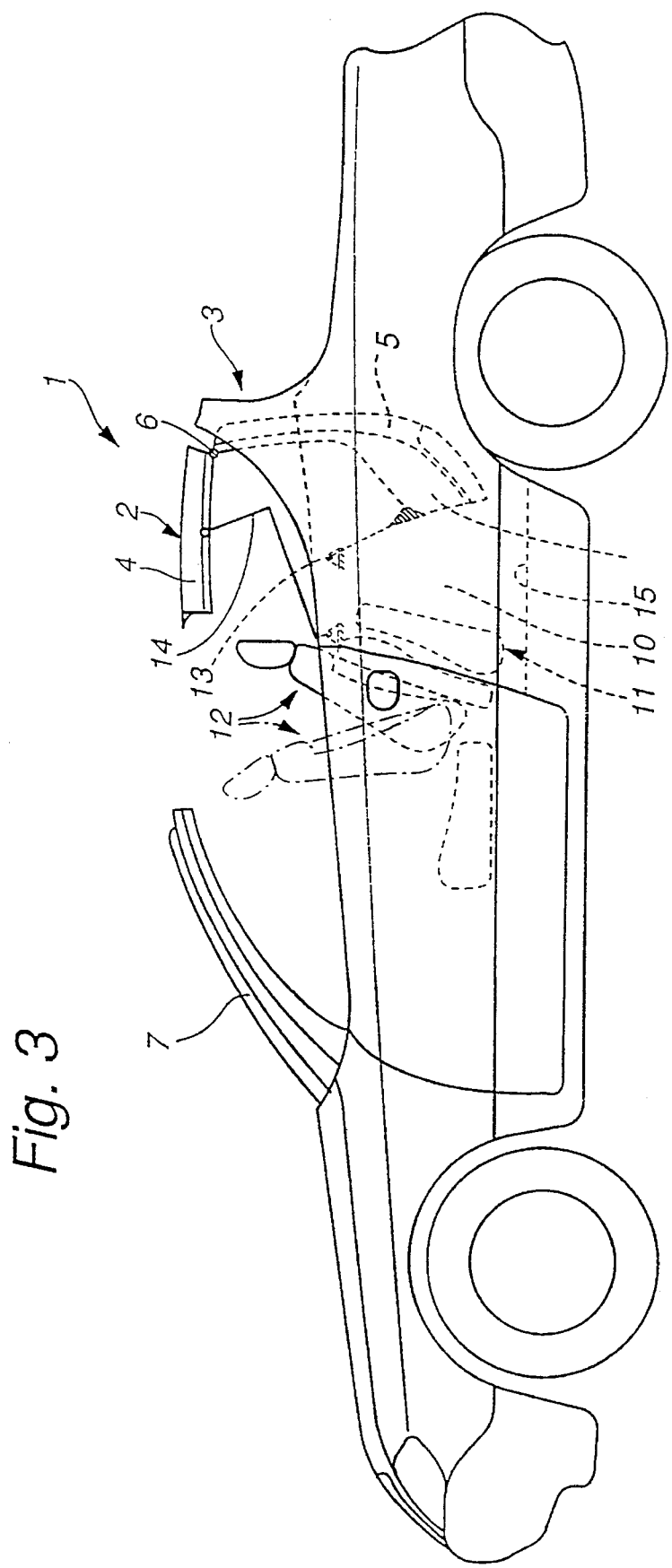
FIG. 3 is a schematic side view of the convertible of FIG. 1 after a first phase of the closing movement of the folding roof.

Referring to FIGS. 1–3, the side views show a convertible 1, the body of which is provided with a roof structure which comprises a two-part folding roof 2 and a rollover bar 3. The folding roof 2 is designed as a solid roof made of light alloy or plastic, a forward roof shell 4 being connected in a jointed manner to a rearward roof shell 5. For the jointed connection, use is made of hinge joints 6, which are arranged in the region of a butt joint between the forward roof shell 4 and the rearward roof shell 5.

With the folding roof 2 closed in accordance with FIG. 1, the forward roof shell 4 extends from a front frame of the windscreen 7 approximately as far as the rearward ends of front side windows 8. The front side windows 8 can be retracted into their associated side door. Adjoining the forward roof shell 4 to form a flush surface is the rearward roof shell 5. The flush surface forms a roof-surface area with a roof line that slopes downwards towards the rear and continues in a rear-wall area 9 which has lateral roof pillars and a rear window. The rear-wall area 9 slopes obliquely downwards towards the rear and encloses an obtuse angle with the roof-surface area situated in front of it.

The rear-wall area 9 of the closed folding roof 2 is partially covered by a crossbar which connects lateral supporting pillars of the rollover bar 3 to one another. These supporting pillars are secured vertically on the side walls of the body to the side of the rear-wall area.

Arranged between the supporting pillars of the rollover bar 3, which have a long foot, is an opening of a stowage space 10. The stowage space 10 is situated between the side walls of the body. Through the opening, the relatively long rearward roof shell 5 can be retracted into the stowage space 10.

To ensure that the stowage space 10 can provide two occasional seats when the folding roof 2 is closed, a rear seat bench 11 is held in its in-use position in the stowage space. The rear seat bench includes a seat-cushion part and a backrest part. In order to free the stowage space 10 for the process of retracting the rearward roof shell 5, the rear seat bench 11 can be unlocked, whereupon the backrest part can first of all be folded down onto the seat-cushion part and the rear seat bench can then be folded forwards into a steeply raised position behind the front seats 12, as shown in FIG. 2. The stowage space 10 is thus bounded at the front by the underside of the raised seat-cushion part of the rear seat bench 11, the seat-cushion part ending at a distance below the top edges of the side walls.

The folding roof 2 can now be folded down into its stowage position, once roof shell 4 has been released from the frame of the windscreen 7 by unlocking it. During this process, roof shell 5, which can be retracted into the stowage space 10, is swung exactly on a circular path about a horizontal transverse pivot 13 of the vehicle. The pivot 13 is arranged offset towards the front relative to the rear-wall area 9. During this process, the forward roof shell 4, which is taken along by means of the hinge joints 6, is, while being lowered, guided by means of an angled pair 14 of guide levers in such a way as to produce a parallel displacement of the forward roof shell 4.

During the lowering movement, roof shell 5 is swung downwards through a total angle of about 130° about the transverse pivot 13 of the vehicle, after which the forward roof shell 4 covers the opening of the stowage space 10 in the manner of a cover. By virtue of this large swing angle of roof shell 5, its rear-wall area 9 lies approximately horizontal at a slight distance above a large floor area 15 of the vehicle floor which bounds the stowage space 10 at the bottom. Above the rear-wall area 9 of the stowed roof shell 5 there is thus a considerable free space, which can be used as a luggage space 16 in addition to the boot of the convertible 1.

In order to prevent damage to the rear-wall area 9 by the luggage and to obtain a larger flat standing surface, a bottom plate 17 serving as a luggage shelf projects rearwards from the underside of the seat-cushion part of the locked rear seat bench 11 at an appropriate distance from the rear-wall area 9. This bottom plate 17 is supported on the seat cushion along its front edge by way of hinge joints 18 and is secured in the in-use position shown against being folded down beyond this in-use position.

To secure this in-use position, in which the bottom plate 17 slopes forward slightly, two bracing ropes 19 are provided. The bracing ropes 19 are stretched across at the sides of the bottom plate 17, running obliquely upwards towards the front to connect an associated rear end region of the bottom plate 17 to an associated suspension point on the seat-cushion part of the rear seat bench 11. Bracing ropes 19, which can also be straps, wire cables or other tensile elements resistant to extension, are particularly expedient by virtue of the fact that they extend at the sides-of the bottom plate 17 because they are able to prevent the luggage from slipping sideways on the bottom plate 17. They also represent virtually no hindrance to the folding up of the bottom plate 17 under or behind the seat-cushion part of the rear seat bench 11, which must be carried out before the rear seat bench 11 is folded back into its in-use position.

The height and length of the luggage space 16 are so generously dimensioned that there is enough space in it for two relatively large suitcases 20, placed crosswise one behind the other. It goes without saying that the suitcases 20 or similar pieces of luggage can additionally be secured in position by a luggage spider 21 or similar lashing devices. To facilitate operation, the function of the luggage spider 21 could here be taken over by a roller blind web of a roller blind (not shown).

To ensure that the contents of the luggage space 16 are not visible from outside the vehicle, the elongated see-through opening between the upper side of the seat-cushion part, the underside of the roof shell 4 and the side walls of the body can be covered by an opaque screening device. As a screening device, it is expedient to use a roller blind, the winding roller 22 of which is arranged along the rear end of the seat-cushion part of the rear seat bench 11. A roller blind web 23 can be pulled upwards on a drop rod from the spring-loaded winding roller 22, after which the drop rod can be hooked in at the front end of the roof shell 4. After the drop rod has been unhooked, the roller blind web 23 snaps back into its wound-up rest position. As the rear seat bench 22 is folded back, the roller blind is thus also taken along and, as the rear seat bench is folded forward, automatically moves again into its position of readiness under the see-through opening.

It would be conceivable to arrange the winding roller 22 and the winding roller of the roller blind web serving as a luggage net 21 in a common housing to give a double roller blind.

In order to achieve greater security against theft for luggage accommodated in the luggage space 16, the means for locking the rear seat bench 11 in its out-of-use position and for locking the roof shell 4 acting as a cover can, if required, be lockable by a common lock, and the lock can expediently act on one or both links of the pair 14 of guide levers 80 as to block any swinging movement. In addition, the falling rod of the roller blind web 23 can be fixable on the front end of roof shell 4 by lockable snap fasteners or the like.

In order to be able to easily load and unload the luggage space 16, the backrest of the front seats is expediently capable of being folded forward in a manner known per se, as indicated in FIG. 3. A locked intermediate position of the folding roof 2, the position likewise being shown, can furthermore be provided, the folding roof passing through this position as it is opened and closed. In this position, the forward roof shell 4 partially covers the stowage space 10 with a vertical clearance.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A stowage-space arrangement for a vehicle having a folding roof, comprising:

a stowage-space arranged between side walls of a body of the vehicle;

at least one rearward roof part of the folding roof arranged to retract into the stowage-space, said rearward roof part having a rear-wall sloping obliquely relative to a roof surface;

wherein said stowage space has as a bottom end a large-size floor area, said large-size floor area being covered by the rear-wall area with the folding roof stowed;

a luggage space provided above said rear-wall area of said rearward roof part in a retracted position; and wherein a lower boundary of the luggage space is formed of a luggage shelf spanning across the rear-wall area at a clearance above the rear-wall area.

2. A stowage-space arrangement according to claim 1, further comprising a forward roof part of said folding roof, wherein with said folding roof stowed, an upward-facing opening of the stowage-space is substantially covered by the forward roof part, by which the luggage space is bounded at a top.

3. A stowage-space arrangement according to claim 1, wherein the luggage shelf is formed of a bottom plate projecting rearwardly from a holding component arranged in front of the luggage space.

4. A stowage-space arrangement according to claim 3, wherein said holding component is a seat-cushion part of a rear-seat bench.

5. A stowage-space arrangement according to claim 3, further comprising a raisable mounting for mounting said bottom plate on said holding component.

6. A stowage-space arrangement according to claim 5, further comprising an arrangement of tensile elements provided between the bottom plate and the holding component, said arrangement of tensile elements being placed in a tensioned position by a lowering of the bottom plate.

7. A stowage-space arrangement according to claim 1, wherein the stowage space is a rear-seat area, a rear-seat arrangement of said rear-seat area being folded forwardly into an out-of-use position, after which one part of said rear-seat arrangement forms a front boundary wall of the luggage space.

8. A stowage-space arrangement for a vehicle having a folding roof, comprising:

a stowage-space arranged between side walls of a body of the vehicle;

at least one rearward roof part of the folding roof arranged to retract into the stowage-space, said rearward roof part having a rear-wall sloping obliquely relative to a roof surface;

wherein said stowage space has as a bottom end a large-size floor area, said large-size floor area being covered by the rear-wall area with the folding roof stowed;

a luggage space provided above said rear-wall area of said rearward roof part in a retracted position;

further comprising a forward roof part of said folding roof, wherein with said folding roof stowed, an upward-facing opening of the stowage-space is substantially covered by the forward roof part, by which the luggage space is bounded at a top; and wherein an elongated see-through opening is formed between a front end of said forward roof part and a front boundary of the luggage space when the folding roof is stowed, said elongated opening being covered via a screening device.

9. A stowage-space arrangement according to claim 8, wherein said screening device is a roller-blind web.

10. A stowage-space arrangement according to claim 8, wherein said screening device comprises a roller-blind web and a winding roller, said roller blind web being unwound from said winding roller.

11. A stowage-space arrangement according to claim 10, wherein said winding roller is arranged along a lower side of said elongated see-through opening.

12. A stowage-space arrangement according to claim 10, further comprising a further winding roller, onto which a further roller-blind web can be used for securing any luggage in the luggage space.

* * * * *